(12) United States Patent
Kumar

(10) Patent No.: US 10,650,306 B1
(45) Date of Patent: May 12, 2020

(54) USER REPRESENTATION USING A GENERATIVE ADVERSARIAL NETWORK

(71) Applicant: Amazon Technologies, Inc., Seattle, WA (US)

(72) Inventor: Anjishnu Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 15/719,913

(22) Filed: Sep. 29, 2017

(51) Int. Cl.
*G06N 3/04* (2006.01)
*G06N 3/08* (2006.01)
*G10L 15/22* (2006.01)
*G06F 3/16* (2006.01)

(52) U.S. Cl.
CPC ........... *G06N 3/0454* (2013.01); *G06F 3/167* (2013.01); *G06N 3/08* (2013.01); *G10L 15/22* (2013.01)

(58) Field of Classification Search
CPC .................................................. G06N 3/0454
See application file for complete search history.

(56) References Cited

U.S. PATENT DOCUMENTS

| 6,049,793 | A | * | 4/2000 | Tomita | G06K 9/6253 706/17 |
| 2015/0032443 | A1 | * | 1/2015 | Karov | G06F 17/2785 704/9 |
| 2015/0185995 | A1 | * | 7/2015 | Shoemaker | G06F 3/0484 715/708 |

OTHER PUBLICATIONS

Chen, Xi, Yan Duan, Rein Houthooft, John Schulman, Ilya Sutskever, and Pieter Abbeel. "Infogan: Interpretable representation learning by information maximizing generative adversarial nets." In Advances in Neural Information Processing Systems, pp. 2172-2180. 2016.
Goodfellow, Ian. "NIPS 2016 tutorial: Generative adversarial networks." arXiv preprint arXiv:1701.00160 (2016), 57 pages.
Odena, Augustus, Christopher Olah, and Jonathon Shlens. "Conditional image synthesis with auxiliary classifier gans." arXiv preprint arXiv:1610.09585 (2016), 14 pages.

* cited by examiner

*Primary Examiner* — Asher D Kells
(74) *Attorney, Agent, or Firm* — Occhiuti & Rohlicek LLP (57) ABSTRACT

An interactive system makes use of a concise user representation, for example, in the process of making predictions of a user's next action. In some examples, the concise user representation is computed from a larger amount of user data, which is processed using a transformation trained using a Generative Adversarial Network (GAN) approach.

18 Claims, 8 Drawing Sheets

USER REPRESENTATION USING A GENERATIVE ADVERSARIAL NETWORK

BACKGROUND

This invention relates to using a generative adversarial network for forming a user representation, and more particularly, use of such a formed user representation for prediction of user actions or providing recommendations to a user via an interactive user interface.

Interactive user interfaces may support multiple "turns" of interactions with a user, for example, with the user providing a command or other input via the interface, and then providing a further command or other input. For example, the user may provide a first command "I need to order a taxi," and then provide a second command "I am going to the airport." In some interactive systems, it may be useful for the automated system to anticipate the second command, and prompt the user "Where are you going?". In order to anticipate the second command, it is useful to predict what will be the user's next action. Considerations in the technology of human-computer interfaces include usability, time efficiency, and accuracy of computer response, which may be impacted by the accuracy of an interactive user interface being able to anticipate or predict a user's next action.

DETAILED DESCRIPTION

Figure 1:
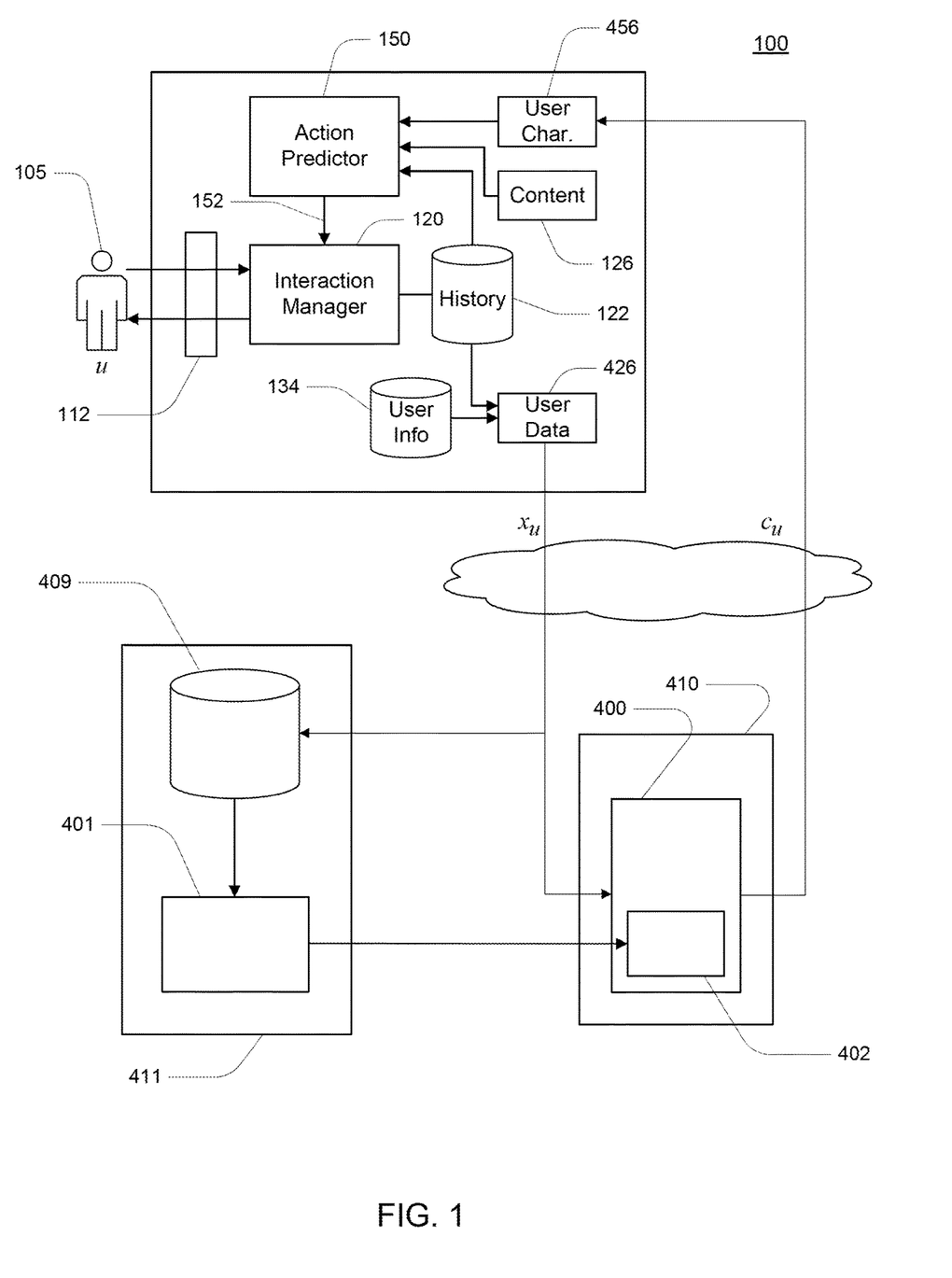
FIG. 1 is a block diagram of an interactive system.

Referring to FIG. 1, an interactive system 100 includes a runtime system 110, which is used to interact with a user 105 (denoted u). The user interacts via a user interface 112 with an interaction manager 120 of the runtime system 110, for example, by providing spoken input to via a microphone, text via a keyboard, and/or manual input via a mouse, and by receiving output from the interface in the form of voice or other audio, visual text, other visual information and/or other system response (e.g., as perceptible actions in the user's environment). As an example, the runtime system 110 is hosted in an "appliance" that is placed in a residential room (e.g., a living room) and the user speaks voice commands to interact with the appliance when the user is in the acoustic environment of appliance (e.g., the user is in the same room). In some implementations, the functions described as being hosted in the appliance may be separated with some functions hosted in a local device placed in the user's environment and some functions hosted at a server that is remove from the local device in data communication with the device, for example, over the public Internet. For the sake of exposition, an embodiment where all the functionality is hosted in the appliance is described first below.

As is discussed more fully below, the interaction manager 120 makes use of a prediction of the user's further action (e.g., the anticipated next commanded action or other input) in order to provide a natural, efficient, and accurate interaction with the user. For example, the interface may use the predicted action to suggest that action to the user (e.g. "would you like to <predicted action>?"), or to disambiguate or correct a recognized input from the user. It should be recognized that the prediction of a user's next action may be very specific to each user and the user's past interactions and therefore there is utility in characterizing each user in a way that permits accurate generation of such a personalized prediction.

Aspects described in more detail below provide an improvement in the technology of human-computer interfaces in one or more areas including usability, time efficiency, and accuracy of computer response. For example, by better predicting a user's next action, the system may be able to accomplish the user's task more quickly or with fewer interactions with the user, and potentially with fewer errors in interpretation. Such technical improvements may make the interface more desirable and/or usable for the user.

Very generally, the runtime system 110 includes an action predictor 150, which in this embodiment receives three types on inputs in order to compute a predicted further action 152. These types of inputs may include a context 126, such as a time of day, a geographic location, or other feature that may not be specific to the particular user (although it may also be specific to the type or location of the appliance). The context 126 is not necessarily required. Another type of input to the action predictor 150 is a linguistic and action history 122, which may be referred to as an interaction history. For example, this history may include recent words spoken or otherwise input by the user and interpretations of the user's input, for example, recent actions commanded by the user (e.g., skills and intents used by the user). A third type of input is user characteristics 456, which is a representation of the user as a set or vector of numerical or categorical quantities, collectively represented as $c_u$ for a user denoted U (which may be referred to in the singular as a user characteristic). One or more embodiments described below address how the runtime system 110 is configured with the user characteristics, and the manner of generating those characteristics.

Figure 8:
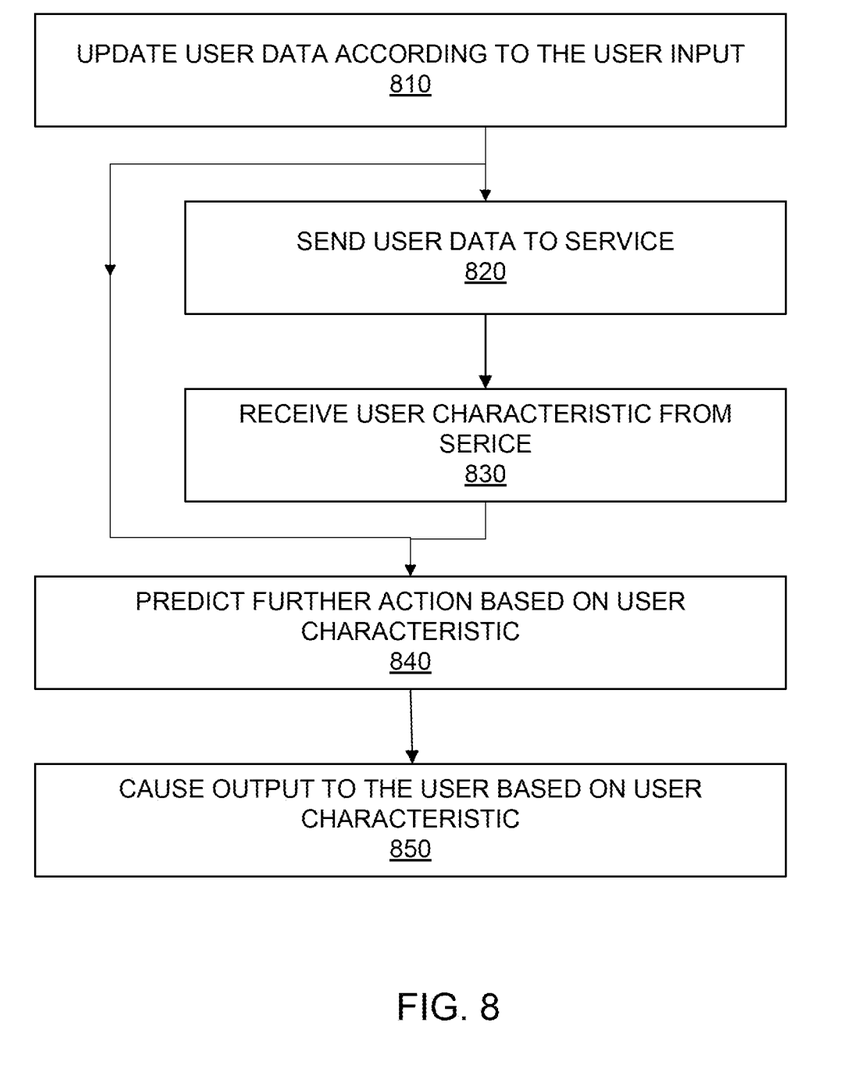
FIG. 8 is a flowchart.

Continuing to refer to FIG. 1, and referring to the flowchart of FIG. 8, the runtime system collects information about the user, including the linguistic and action history 122, as well as other user information 134, which may include demographic and personal preferences (e.g., movie genre preferences). Collectively, this information about the user u forms user data 426, denoted $x_u$. That is, the system processes input received via the user interface and updates the user data (step 810). One way of representing the user data is as a vector, with a separate element being associated with each of the possible actions or other characteristics of the user. It should be recognized that if the system is capable of a large number of actions, this vector will in general be very sparse (e.g., with zeroes in elements that indicate whether the user has used to corresponding action or the number of times the user has used that action). Although it may be effective to collect the information about the user u as a vector $x_u$, the size and/or scarcity of the vector may not be suitable or desirable as an input to the action predictor 150.

The action predictor 150 performs a parameterized computation, which as introduced above, determines an action prediction 152 based on the history 122 as well as information about the user. For example, the action predictor is implemented using an artificial neural network (ANN), which is parameterized with a set of numerical weights that control the mapping from the input to the output predicted action. In general, the parameters of the action predictor 150 are determined and updated based on the interactions with the user. For example, after observing a sequence of interactions with a user, the runtime system 110 may perform a parameter update to improve the prediction accuracy of the action predictor. In the case on an ANN implemented action predictor, these parameter updates may make use of a gradient-based incremental updating of the weights, for example, using a Back-Propagation procedure.

Although providing the user data 426 directly as input to the action predictor 150 may be feasible, the number of values and scarcity of the information in the user data 426 may limit the effectiveness of the action predictor. Rather than providing the user data 426 directly as an input, the user data 426 ($x_u$) is processed to form the more concise user representation 456 ($c_u$), which is represented with substantially fewer values than the full user data.

The more concise user representation 456 $c_u$ is determined from the user information 426 $x_u$ using a user inference module 400, which may be referred to as a "user characterizer." Because the user information may change relatively slowly, the inference of the user representation from the user information may be performed only from time to time (e.g., once a week). The computation involved in this inference does not have to be hosted in the appliance. Generally, the user information is passed in a message to a server computer 410 (step 820 in FIG. 8) where the concise representation is computed and returned to the appliance in a reply where it is received (step 830). That is, the conversion from user information to the user representation may be performed as a network-based service by the inference module. Note that as illustrated in the flowchart, the user data is only passed to the server from time to time, while more generally, the steps of sending the data to the server and receiving the concise representation are omitted. As introduced above, this concise representation is used to predict a further action by the user (step 840), and then an output (e.g., an audio prompt) may be determined based on the predicted action and output to the user (step 850).

Note that in FIG. 1, only a single runtime system 110 is illustrated. However, it should be recognized that a single server computer 410 hosting the user inference module 400 may serve many (e.g., hundreds or thousands or more) runtime systems 110 for many different users. Furthermore, multiple instances of the server computer 410 and its inference module 400 may be used to service a large number of runtime systems 110.

Figure 2:
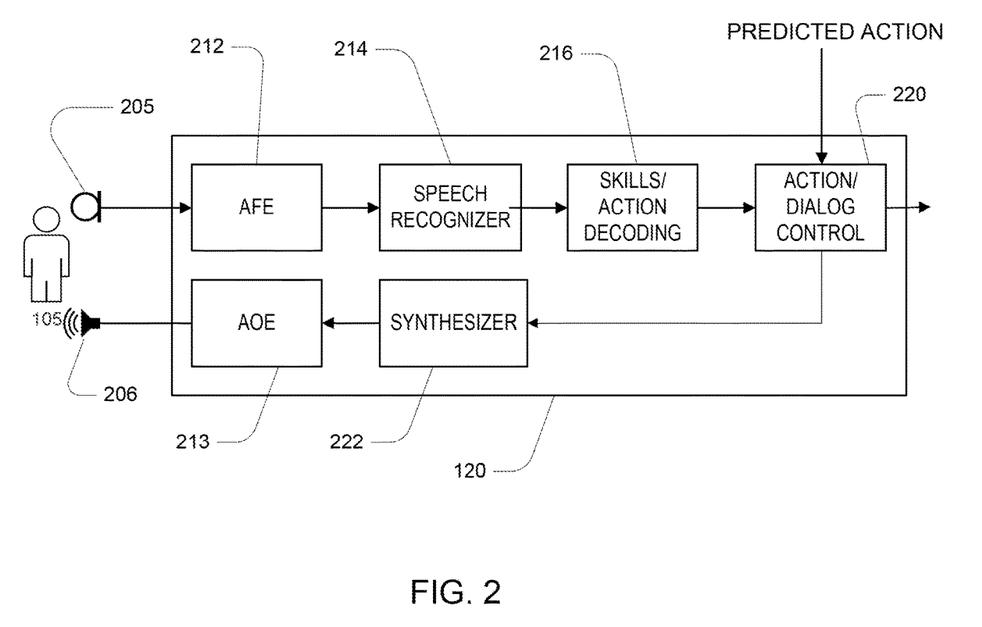
FIG. 2 is a block diagram of an interaction manager of the system shown in FIG. 1.

Turning to FIG. 2, in one embodiment, the interaction manager 120 of the presently described embodiment is coupled to (e.g., directly over an analog and/or digital communication path) to a microphone 205 and a speaker 206 for acquiring acoustic signals and producing acoustic signals, respectively, in the environment. The microphone 205 provides signals to an acoustic front end (AFE) 212, which processes the signal and produced a feature representation of the audio. For example, the feature representation comprises a numerical vector whose elements represent signal energy in different audio frequency bands computed at a regular rate, for example, once every 10 milliseconds. The feature representation is passed to a speech recognizer 214, which produces a recognizer output that includes a word-based representation of the user's input, for example, as a transcription of the user's spoken words, or as a lattice, which represents alternative interpretations of the words spoken by the user, or as a linguistically-based intent of the user. This recognizer output is passed on a skill and action decoding module 216. A purpose of this module is to identify a skill being exercised by the user (e.g., a skill of controlling lights and appliances) and/or a specific action being requested by the user (e.g., turn on the living room lights). In some implementations, a number of alternative skill and action outputs are proposed by the module. An action and dialog control module 220 processes the output of the skill and action decoding module, for example, to make a determination of the user's intent. In some cases, this control module controls confirmation and disambiguation dialogs with the user.

The action and dialog control 220 shown in FIG. 2 also makes use of the predicted further action provided to it by the action predictor 150 (shown in FIG. 1) generally to cause the interaction with the user, for example an output to the user, to be according to the predicted further action. For example, the predicted action may be used to disambiguate between alternative actions proposed by the skills and action decoding module 216. In some examples, the action and dialog control module 220 makes use of the predicted action to prompt the user, for example, with a prompt such as "Would you like to <predicted action>?". For example, the control module 220 passes the text to a speech synthesizer 222, which computes a waveform that it passes to an acoustic output end 213 that drives the speaker 206.

Turning back to FIG. 1, the user inference module 400 is configured with a set of parameters 402, which are the same for a large number of users, and which control the mapping for each user u of the user's user data 426 $x_u$ to yield that user's user characteristics 456 $c_u$. These parameters 402 are determined by a configuration system 401, hosted on a server computer 411, which may be, but is not necessarily, separate from the server 410 hosting the inference module 400. The configuration system makes use of user data 426 from a large number of users that is collected in a user data database 409. Very generally, the configuration system 401 processes the user data in the database to determine the parameters 402 such that a concise user characteristic $c_u$ represents underlying latent attributes of a user u, which may not be evident in the full user data $x_u$. The term "latent attributed" is used to mean are variables that are not directly (e.g., explicitly) represented in the user data $x_u$ but are rather inferred (e.g., through a mathematical model) from other variables that are directly represented.

A Generative Adversarial Network (GAN) is a particular implementation and structure for a generative model. The term "generative model" is used to denote a structure or procedure that characterizes a distribution of a set of items, for example, by specifying a probability distribution for the items and/or providing a way of generating samples of the items that are drawn from such a distribution.

In general, a GAN is formed from a set of items that are known to come from a particular distribution, and the GAN is formed such that it can generate further samples apparently from that same distribution. One part of forming the GAN is estimating values of parameters that characterize the GAN, and that therefore characterize the distribution of the items. One feature of forming the GAN for a set of items is that the process can disentangle a representation of underling concepts or characteristics that define the items of the distribution. An Information-Theoretic extension to the GAN ("InfoGAN") is one type of GAN, which is used to learn a disentangled representation of items that aims to expose important semantic features of the items. Generally, the generative model represented by an InfoGAN takes values of a set of latent variables, in combination with values of random noise variables, and produces an item corresponding to the latent variables. This process can be "inverted" such that an InfoGAN can take an item, and produce corresponding values of the set of latent variables. One result of this process is that a distribution involving a large number of related explicit variables may be represented using a much smaller number of latent variables.

Figure 3:
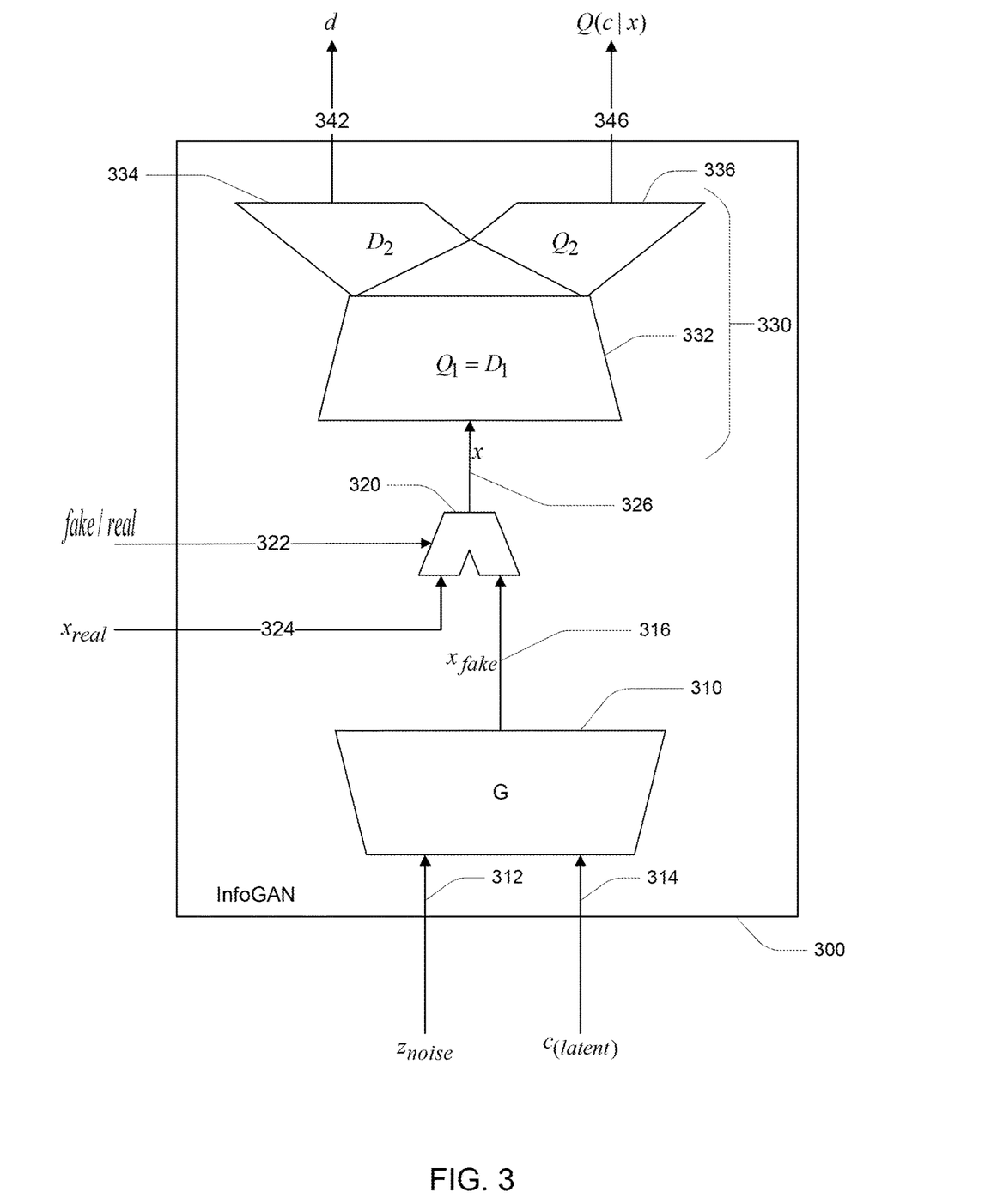
FIG. 3 is a block diagram of a Generative Adversarial Network.

Referring to FIG. 3, the approach implemented in the user inference module 400 is based on a Generative Adversarial Network (GAN) 300 shown in FIG. 3. In particular, an "information theoretic" GAN, which may be referred to as an "infoGAN" is used in the presently described embodiment.

The GAN 300 includes a generator G 310, whose output x has the same structure as the user information $x_u$ 426. For example, G is a multiple layer artificial neural network. The output has the same number of elements, which represent the same aspects of the user information (e.g., a number of times a particular word has be used by the user ii). The generator G 310 takes two inputs. One input is a latent representation $c=(c_1, \ldots, c_L)$ 314 that corresponds to the output x. That is, the essential character of the user information is to be encoded in the latent representation. The output input is a "noise" vector z, which represent variation in the user information for different users that have the same essential character. The noise z is assumed to come from a predetermined distribution $P_z(z)$, for example, a multivariate Gaussian distribution with an identify covariance and zero mean. The latent representation is also assumed to come from a known distribution, for example but not necessarily of the form $P(c)=\Pi_i P_c(c_i)$ where, for example, $P_c(c)$ is a Normal (for a continuous latent variable) or Bernoulli (for a binary variable) Distribution. As discussed in more detail below, the Generator G 310 is parameterized, and the parameters are chosen such that to the degree possible given the structure of the generator, by drawing the latent variables c and noise variables z at random from the specified probability distributions, the resulting distribution of the generator is as indistinguishable from the (e.g., empirical) distribution of $x_u$ over the population of users. Given such a generator, the inference module 400 is configured to essentially invert the generator to yield the most likely latent variables value $\hat{c}_u$ that would yield $x_u$ at the output of G over the distribution of unknown noise values.

The GAN 300 includes a section 330 that implements a mapping from user information x to yield two outputs. The section 330 may also be implemented as an artificial neural network. One output Q(c|x) 346 represents an inferred distribution over latent variables c, for example, as vector of probabilities that each of the elements $c_i$ is 1, treating these values as conditionally independent given x. The other output d 342 is a probability that is meant to discriminate between the input x having been generated as "fake" user data by the generator G 310, as compared to the input being "real" user data $x_u$ for some user u.

In FIG. 3, the input x 326 is illustrated as, at least conceptually, being provided by a selector 320 that chooses between "real" user data, denoted $x_{real}$ (i.e., $x_u$ for some user u), and "fake" data, denoted $x_{fake}$ (i.e., obtained from the generator G 310. The selector has a control input 322 (denoted "fake/real"), such that a control input of 1 means that the input x came from the generator G.

Very generally, the parameters of the GAN 300, which include the parameters of the generator G 310, as well as the parameters of the section 330, are chosen such that the output d 342 provides as little information about the control input to the selector, while the output Q(c|x) 346 provides as much information as possible about the latent input c 314 to the generator.

The section 330 of the GAN 300 includes one section 332 that is used to generate both the outputs, and is denoted $Q_1$ or alternatively as $d_1$. The output of this section is passed to as section 334, denoted $D_2$, which provides the output d 342, and is passed to a section 336, denoted $Q_2$, which provides the output Q(c|x) 346. Using a functional notation, $d=D_2(D_1(x))=D(x)$ and, $Q(c|x)=Q_2(Q_1(x))=Q(x)$.

The determination of the parameters of the GAN 300 therefore involves determining the parameters of G, $Q_1$, $Q_2$, and $D_2$ according to an overall objective function that is minimized. This objective involves a term $V_{GAN}=\text{ave}_{real}(\ln(1-d))+\text{ave}_{fake}(\ln d)$ which is larger to the extent that the GAN can discriminate between "real" and "fake" data.

The objective also involves a term $I_{C|X}=\text{ave}_{fake} \ln Q(c|G(z,c))$ which is larger to the extent that the GAN accurately recovers the information in c in the output Q 346. The term $\ln Q(c|G(z, c))$ is decomposed as the sum of terms $\ln q_i(c_i|G(z, c))$ where the $q_i(c_i|G(z, c))$ are outputs of $Q_2$.

The overall objective is $V_{GAN}-\lambda I_{C|X}$ for a positive constant λ (e.g., 0.5) minimized over the parameters of G, $Q_1$, and $Q_2$, and maximized over the parameters of $D_7$. For instance, for each incremental update of the parameters of G, $Q_1$, and $Q_2$, for example, using a gradient approach such as Back Propagation to reduce the objective, multiple iterations of updating of the parameters of $D_2$) maximizing the objective are performed.

In some examples, for example, in which the latent variables c are continuous variables, the $Q_2$ network directly outputs an estimate ĉ rather than a distribution Q(c|x) In order to compute the required terms in the objective function $I_{C|X}$ a distribution around ĉ is assumed, for example, based on an estimate of variances or covariance of the estimate. For example, the estimate of the covariance may be formed by processing the set of observed (c, ĉ) pairs during training.

In some implementations, G 310 and Q, 332 have an additional input with variables representing known aspects of the user, such as the user's age or gender.

Figure 4:
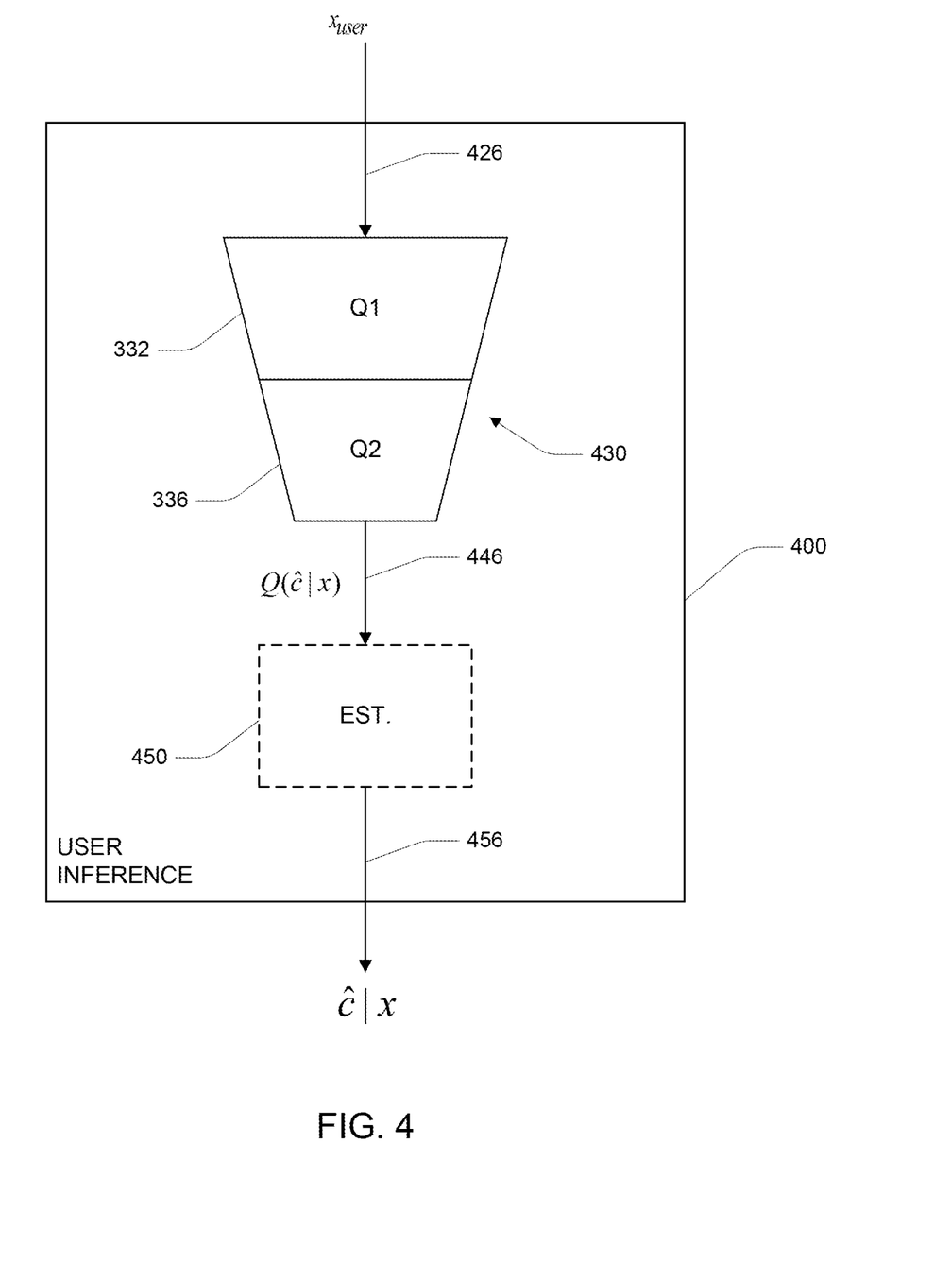
FIG. 4 is a block diagram of a user inference component of the system shown in FIG. 1.

After the parameters of the GAN 300 are determined, the parameters of $Q_1$ and $Q_2$ are retained as the parameters 402 (see FIG. 1) for the inference module 400. Referring to FIG. 4, the user inference module 400 includes the sections $Q_1$ and $Q_2$, as well as an estimator 450, which receives the distribution Q(c|x) 446, and selects the highest probability latent variables ĉ as the inferred user representation. Note that in the case that the estimates of the latent variable are computed directly by $Q_2$, the estimator 450 is omitted as the output of $Q_2$ is already ĉ. By virtue of the training procedure, the latent variables that are essentially selected by the training are substantially independent in a statistical sense.

The "InfoGAN" approach described above is only one example of an approach to determining parameters of a user inference module 400 that is configured to infer concise user characteristics $c_u$ from more extensive and/or difficult to interpret user data $x_u$. For example, other clustering or classification approaches may be used based on a database of interpret user data $x_u$ to configure the user interface module.

Furthermore, the concise user characterization $c_u$ is described above as used to improve the ability to predict a user's next action. However, it should be understood that there are numerous other uses of such a user characterization, for example, for predicting preferences and linguistic characteristics (e.g., phrases used).

One example of the concise user characterization is an input to a speech recognizer. For example, in a language modeling component of a speech recognizer, which can be used to predict a next word from a history of past words or can be used to score an entire word sequence, the user characterization may be used as an input to a neural network or a statistical predictor of the language modeling component. In another example, the concise representation may be used as an input to a skills or intent decoder, which can process a sequence of words entered (e.g., spoken) by a user and predict the intended skill or intent within a skill that the user used or expressed. For example, in a neural network implementation of such a decoder, the concise user representation may be provided as an additional input in conjunction with the words entered. For speech synthesis, the concise representation may be used in a mapping from phonetic targets to a waveform representation, by providing the concise representation as an input in conjunction with the phonetic targets, potentially introducing use characteristics (e.g., gender, dialect, regional pronunciation, etc.) into the voice represented in the waveform. The concise representation may also be used in recommendation tasks, for example, as an input in determining a music recommendation for a user.

Figure 5:
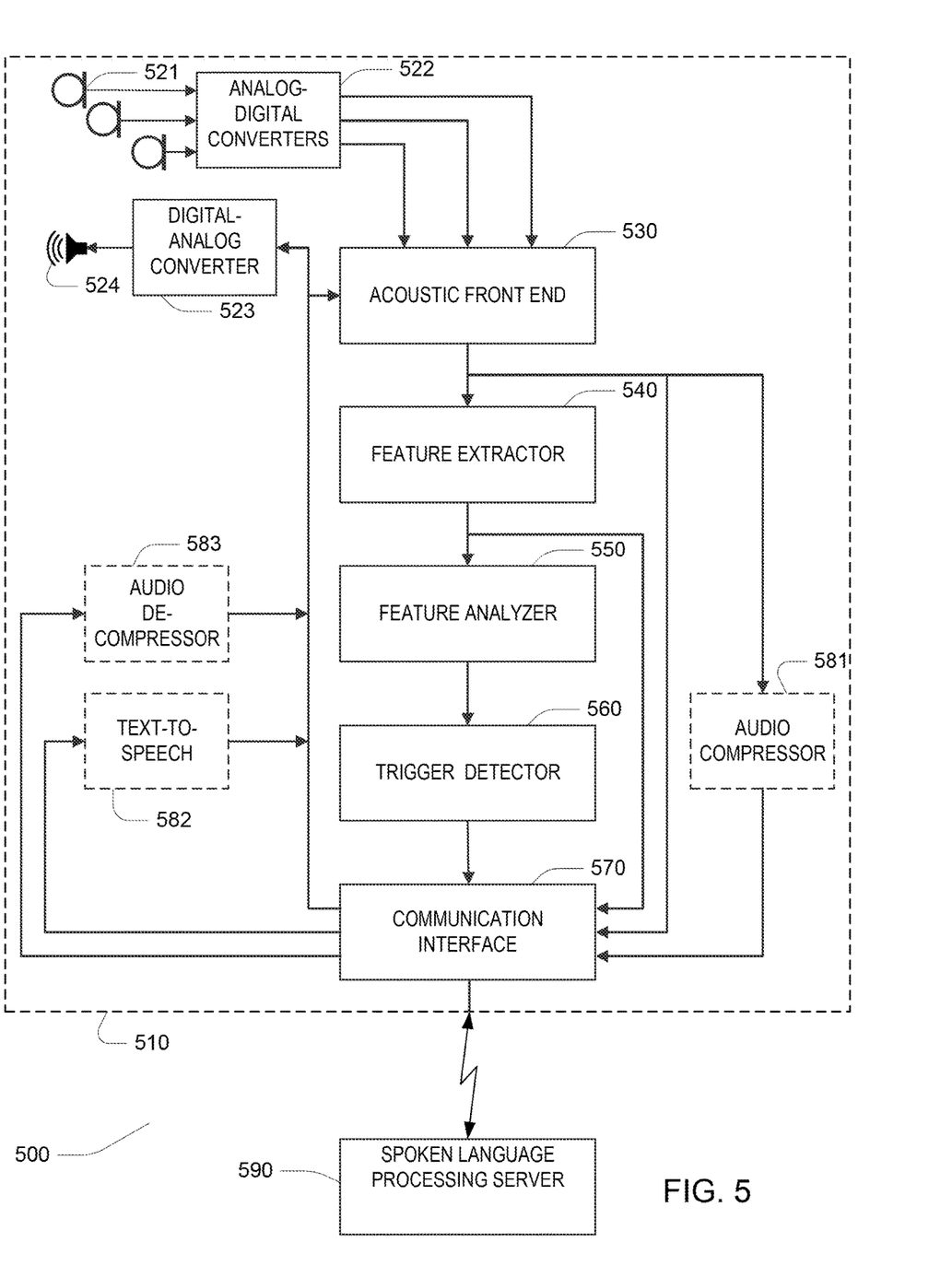
FIGS. 5-6 are a block diagram a speech enabled system.

Referring to FIG. 5, one example of an interactive system 500 making use of the techniques described above includes an audio user interface device 510 and a spoken language processing system 590, which is generally distant from the device 510 and in data communication with the device over a network, for instance over the public Internet. Generally, as discussed below, the system 590 implements most of the functions of the runtime system 510 shown in FIG. 5. The user interface device 510 includes one or more microphones 521, which sense an acoustic environment in which the device 510 is placed. For example, the device 510 may be placed in a living room of a residence, and the microphones acquire (i.e., sense) an acoustic signal in the environment and produce corresponding analog or digital signals, where the acoustic signal may include speech and non-speech sounds. Users in the environment may interact with the system 500. One way for a user to indicate to the system that he or she wishes to interact is to speak a trigger (where "trigger" is used to denote something that initiates a process or reaction), where the trigger may be a predetermined word or phrase (which may be referred to as a "wakeword", or a "trigger word") or some other acoustically distinct event. This trigger is detected by the device 510, and upon detection of the trigger at a particular time (e.g., a time instance or interval), the device passes audio data (e.g., a digitized audio signal or some processed form of such a signal) to a spoken language processing server 590. The device 510 selects a part of the audio data corresponding to a time including an interval of the acoustic signal from a starting time and an ending time, for example, based on an estimate of the time that the trigger began in the acoustic signal and based on a determination that input speech in the acoustic signal has ended. This server processes and interprets the user's acoustic input to the device 510 (i.e., the user's speech input) and generally provides a response to the device for presentation to the user. The presentation of the response may in the form of audio presented via a speaker 524 in the device.

There are several stages of processing that ultimately yield a trigger detection, which in turn causes the device 510 to pass audio data to the server 590. The microphones 521 provide analog electrical signals that represent the acoustic signals acquired by the microphones. These electrical signals are time sampled and digitized (e.g., at a sampling rate of 20 kHz and 56 bits per sample) by analog-to-digital converters 522 (which may include associated amplifiers, filters, and the like used to process the analog electrical signals). As introduced above, the device 510 may also provide audio output, which is presented via a speaker 524. The analog electrical signal that drives the speaker is provided by a digital-to-analog converter 523, which receives as input time sampled digitized representations of the acoustic signal to be presented to the user. In general, acoustic coupling in the environment between the speaker 524 and the microphones 521 causes some of the output signal to feed back into the system in the audio input signals.

An acoustic front end (AFE) 530 receives the digitized audio input signals and the digitized audio output signal, and outputs an enhanced digitized audio input signal (i.e., a time sampled waveform). An embodiment of the signal processor 530 may include multiple acoustic echo cancellers, one for each microphone, which track the characteristics of the acoustic coupling between the speaker 524 and each microphone 521 and effectively subtract components of the audio signals from the microphones that originate from the audio output signal. The acoustic front end 530 also includes a directional beamformer that targets a user by providing increased sensitivity to signal that originate from the user's direction as compared to other directions. One impact of such beamforming is reduction of the level of interfering signals that originate in other directions (e.g., measured as an increase in signal-to-noise ratio (SNR)).

In alternative embodiments, the acoustic front end 530 may include various features not described above, including one or more of: a microphone calibration section, which may reduce variability between microphones of different units; fixed beamformers, each with a fixed beam pattern from which a best beam is selected for processing; separate acoustic echo cancellers, each associated with a different beamformer; an analysis filterbank for separating the input into separate frequency bands, each of which may be processed, for example, with a band-specific echo canceller and beamformer, prior to resynthesis into a time domain signal; a dereverberation filter; an automatic gain control; and a double-talk detector.

A second stage of processing converts the digitized audio signal to a sequence of feature values, which may be assembled in feature vectors. A feature vector is a numerical vector (e.g., an array of numbers) that corresponds to a time (e.g., a vicinity of a time instant or a time interval) in the acoustic signal and characterizes the acoustic signal at that time. In the system shown in FIG. 5, a feature extractor 540 receives the digitized audio signal and produces one feature vector for each 10 milliseconds of the audio signal. In this embodiment, the element of each feature vector represents the logarithm of the energy in an audio frequency band ("log frequency band energies" LFBE), the frequency bands (e.g., frequency bands spaced uniformly in a Mel frequency scale) together spanning the typical frequency range of speech. Other embodiments may use other representations of the audio signal, for example, using Cepstral coefficients of Linear Prediction Coding (LPC) coefficients rather than LFBEs.

The normalized feature vectors are provided to a feature analyzer 550, which generally transforms the feature vectors to a representation that is more directly associated with the linguistic content of the original audio signal. For example, in this embodiment, the output of the feature analyzer 550 is a sequence of observation vectors, where each entry in a vector is associated with a particular part of a linguistic unit, for example, part of an English phoneme. For example, the observation vector may include 3 entries for each phoneme of a trigger word (e.g., 3 outputs for each of 6 phonemes in a trigger word "Alexa") plus entries (e.g., 2 entries or entries related to the English phonemes) related to non-trigger-word speech. In the embodiment shown in FIG. 5, feature vectors are provided to the feature analyzer 550 at a rate of one feature vector every 10 milliseconds, and an observation vector is provided as output at a rate of one observation vector every 10 milliseconds. In general, an observation vector produced by the feature analyzer 550 may depend on not only a current feature vector, but may also depend on a history of feature vectors, for example, on 31 most recent feature vectors (e.g., with the output being delayed by 10 vectors relative to the current feature vector, the 31 vectors include 10 vectors in the "future" relative to the delayed time, and 20 frames in the "past" relative to the delayed time).

Various forms of feature analyzer 550 may be used. One approach uses probability models with estimated parameters, for instance, Gaussian mixture models (GMMs) to perform the transformation from feature vectors to the representations of linguistic content. Another approach is to use an Artificial Neural Network (ANN) to perform this transformation. Within the general use of ANNs, particular types may be used including Recurrent Neural Networks (RNNs), Deep Neural Networks (DNNs), Time Delay Neural Networks (TDNNs), and so forth. Yet other parametric or non-parametric approaches may be used to implement this feature analysis. In the embodiment described more fully below, a variant of a TDNN is used.

The communication interface receives an indicator part of the input (e.g., the frame number) corresponding to the identified trigger. Based on this identified part of the input, the communication interface 570 selects the part of the audio data (e.g., the sampled waveform) to send to the server 590. In some embodiments, this part that is sent starts at the beginning of the trigger, and continues until no more speech is detected in the input, presumably because the user has stopped speaking. In other embodiments, the part corresponding to the trigger is omitted from the part that is transmitted to the server. However, in general, the time interval corresponding to the audio data that is transmitted to the server depends on the time interval corresponding to the detection of the trigger (e.g., the trigger starts the interval, ends the interval, or is present within the interval).

Figure 6:
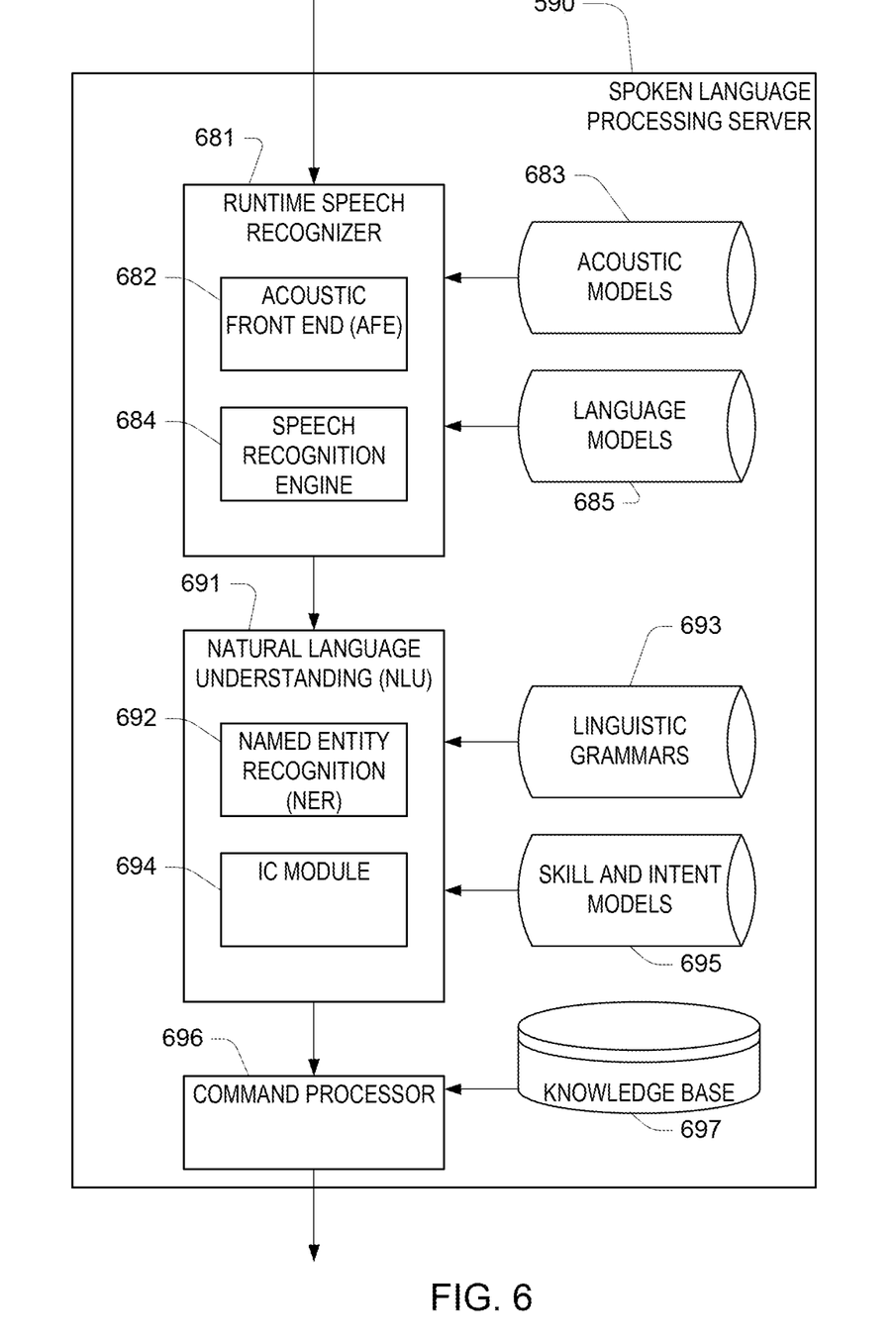

Referring to FIG. 6 processing at the spoken language server 590 may include various configurations for processing the acoustic data (e.g., the sampled audio waveform) received from the audio interface device 510. For example, a runtime speech recognizer 681 uses an acoustic front end 682 to determine feature vectors from the audio data. These may be the same feature vectors computed at the interface device 510, or may be a different representation of the audio data (e.g., different numbers of features, different number per unit time, etc.). A speech recognition engine 682 processes the feature vectors to determine the words in the audio data. Generally, the speech recognizer 681 attempts to match received feature vectors to language phonemes and words as known in the stored acoustic models 683 and language models 685. The speech recognition engine 684 computes recognition scores for the feature vectors based on acoustic information and language information and provides text as output. The speech recognition engine 684 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following processing by the runtime speech recognizer 681, the text-based results may be sent to other processing components, which may be local to the device performing speech recognition and/or distributed across data networks. For example, speech recognition results in the form of a single textual representation of the speech, an N-best list including multiple hypotheses and respective scores, lattice, etc. may be sent to a natural language understanding (NLU) component 691 may include a named entity recognition (NER) module 692, which is used to identify portions of text that correspond to a named entity that may be recognizable by the system. An intent classifier (IC) module 694 may be used to determine the intent represented in the recognized text. Processing by the NLU component may be configured according to linguistic grammars 693 and/or skill and intent models 695. After natural language interpretation, a command processor 696, which may access a knowledge base 697, acts on the recognized text. For example, the result of the processing causes an appropriate output to be sent back to the user interface device for presentation to the user.

The command processor 696 of this embodiment may implement the action/dialog control element shown in FIG. 2, and communicate with the server 410 to provide user data and in return receive a corresponding user characteristic for a user. For example, the command processor 696 may use the concise user representation to determine a predicted next action and cause a prompt to be presented to the user based on that predicted next action.

Figure 7:
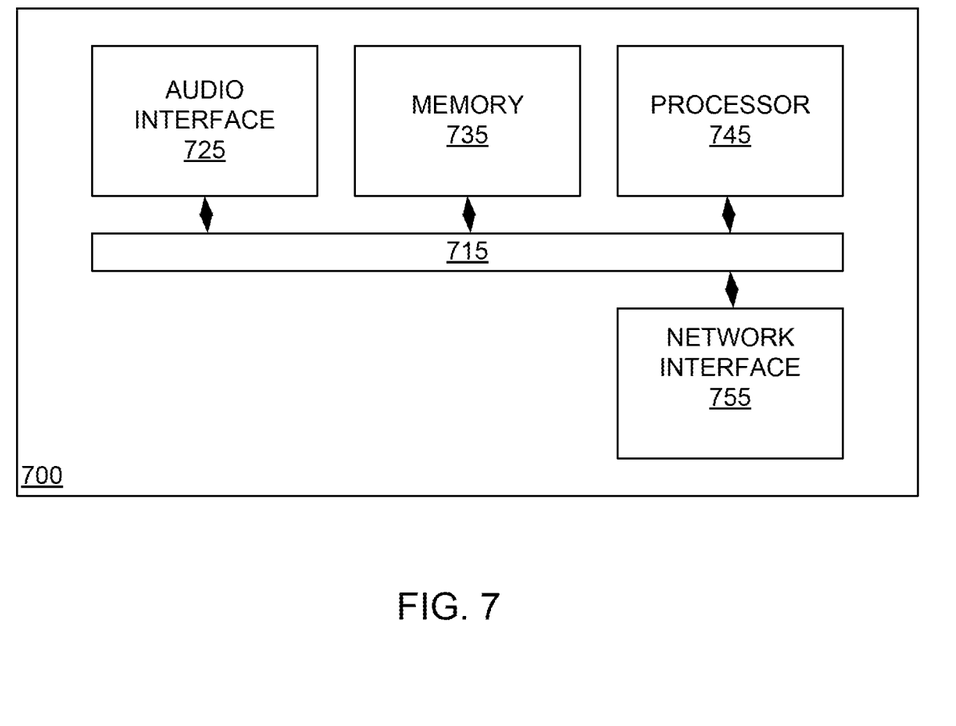
FIG. 7 is a block diagram of a computer.

The approaches described above may be implemented in software, in hardware, or using a combination of software and hardware. For example, the software may include instructions stored on a non-transitory machine readable medium that when executed by a processor, for example in the user interface device, perform some or all of the procedures described above. Referring to FIG. 7, an example of the interactive system shown in FIGS. 5 and 6 may be hosted on one or more computers 700 shown in FIG. 7. The computer 700 may include a bus 715, which interconnects a memory 735 and a processor 745. The memory may store instructions, which when executed by the processor perform functions described above, including the computations for implementing artificial neural networks. In addition, the bus may have an audio interface 725 coupled to it, permitting the processor to cause audio input and output to the passed via a microphone and a speaker, respectively. A network interface may be coupled to be bus for communicating between system over a network. In general, hardware may include special purpose circuitry (e.g., Application Specific Integrated Circuits (ASICs), Field Programmable Gate Arrays (FPGAs) and the like) for performing some of the functions. For example, some of the computations for the neural network transformers may be implemented using such special purpose circuitry.

It is to be understood that the foregoing description is intended to illustrate and not to limit the scope of the invention, which is defined by the scope of the appended claims. Other embodiments are within the scope of the following claims.

The invention claimed is:

1. A method for computer-implemented user interaction comprising:

processing a first user input received via a user interface of the system, including updating user data, that includes a history of interactions corresponding to a first user, according to the first user input;

maintaining a user characteristic corresponding to the first user, the user characteristic comprising values of a plurality of quantitative or categorical variables used to represent the user, the quantitative or categorical variable forming a substantially independent set of variables determined using a Generative Adversarial Network (GAN), the maintaining of the user characteristic including sending the user data to a remote service, and receiving the user characteristic in response to the sending of the user data, wherein the user characteristic is represented using substantially fewer values than the user data, and wherein the remote service is configured according to values of a plurality inference parameters, the inference parameters being computed from user data corresponding to a plurality of users;

predicting a further action by processing at least the user characteristic, and the history of interactions with the user;

determining a first user output using the further action; and providing the first user output via the user interface.

2. The method of claim 1 wherein the system comprises an end-user device, and sending the user data to the remote server comprises transmitting the user data from the end-user device to a server over a data network, and wherein receiving the user characteristic comprises receiving the user characteristic from the server computed by a user characterizer at the server.

3. The method of claim 2 further comprises configuring the user characterizer including receiving user data determined at a plurality of end-user devices, and applying a GAN-based parameter determination procedure to determine the values of the plurality of inference parameters.

4. The method of claim 2 wherein the user characterizer comprises an artificial neural network (ANN) and the inference parameters comprise weights of the ANN.

5. The method of claim 1 wherein the history of interactions comprises a history of words present in input received via the user interface.

6. The method of claim 1 wherein the history of interactions comprises a history of interpretations of input received via the user interface.

7. The method of claim 1 wherein processing the first user input includes performing speech recognition on the first user input representing a spoken utterance by the first user, and updating the user data includes representing use of the words in the spoken utterance in the user data.

8. The method of claim 1 wherein the remote service is configured according to values of a plurality of inference parameters, the inference parameters being computed from user data corresponding to a plurality of users.

9. The method of claim 8 wherein the method further comprises providing the user data corresponding to the first user for use in computing the inference parameters.

10. The method of claim 1 further comprising:

receiving the user data at the remote network-based service over the data network;

processing the user data with a user inference module, the user interface module being configured with parameters, the processing including determining the user characteristic from the user data according to the parameters; and transmitting the user characteristic over the data network.

11. The method of claim 10 wherein the user inference module comprises an artificial neural network (ANN) and the parameters comprise configurable weights of the ANN.

12. The method of claim 11 further comprising:

collecting user data corresponding to a plurality of users;

determining the parameters using a generative adversarial network (GAN) procedure using the user data corresponding to the plurality of users; and configuring the inference module using the parameters.

13. The method of claim 1 wherein the remote service processes user data for a plurality of users received from a plurality of different systems, each corresponding to a different user of the plurality of users.

14. A computer-implemented system comprising:

a user interface for receiving a user input from a user;

a storage for user data corresponding to the user;

a communication interface for sending the user data to a remote network-based service via a data network, and for receiving, via the data network, a user characteristic in response to sending the user data, wherein the user characteristic is represented using fewer values than the user data;

an action predictor configured to process a first user input received via the user interface of the system, including updating the user data, that includes a history of interactions corresponding to a first user, according to the first user input, maintain a user characteristic corresponding to the first user, the user characteristic comprising values of a plurality of quantitative or categorical variables used to represent the user, the quantitative or categorical variable forming a substantially independent set of variables determined using a Generative Adversarial Network (GAN), the maintaining of the user characteristic including sending the user data to the remote network-based service, and receiving the user characteristic in response to the sending of the user data, wherein the user characteristic is represented using substantially fewer values than the user data, and wherein the remote service is configured according to values of a plurality inference parameters, the inference parameters being computed from user data corresponding to a plurality of users, and predict a further action base at least on the user characteristic and the history of interactions with the user; and an interaction manager configured to receive the further action, determine a first user output using the further action, and provide the first user output to the user via the user interface according to the further action.

15. The computer-implemented system of claim 14 wherein the user interface comprises a speech recognizer, and the storage for user data comprises a storage for representing words recognized by the speech recognizer.

16. The computer-implemented system of claim 14 further comprising:

an inference module configurable with parameters for determining the user characteristic from the user data according to the parameters.

17. The computer-implemented system of claim 16 further comprising:

a configuration system configured to accept user data corresponding to a plurality of users and to compute the parameters for the inference module.

18. The computer-implemented system of claim 17 wherein the configuration system is configured to compute the parameters for the inference module using a generative adversarial network (GAN) procedure.

* * * * *